Nov. 4, 1924.  
W. C. RUOPP ET AL  
1,514,586  
VALVE  
Filed June 14, 1921

William C. Ruopp,
Harry McEldowney,
Robert J. Main, and
Russell W. Main.
INVENTOR BY Victor J. Evans
ATTORNEY

WITNESS:

Patented Nov. 4, 1924.

1,514,586

UNITED STATES PATENT OFFICE.

WILLIAM C. RUOPP, HARRY McELDOWNEY, ROBERT J. MAIN, AND RUSSELL W. MAIN, OF UPPER SANDUSKY, OHIO.

VALVE.

Application filed June 14, 1921. Serial No. 477,532.

*To all whom it may concern:*

Be it known that WILLIAM C. RUOPP, HARRY McELDOWNEY, ROBERT J. MAIN, and RUSSELL W. MAIN, citizens of the United States, residing at Upper Sandusky, in the county of Wyandot and State of Ohio, have invented new and useful Improvements in Valves, of which the following is a specification.

This invention relates to improvements in valves and has especial relation to valves utilized for controlling fluid under pressure.

An object of the invention is the provision of a valve of this type which is capable of use for evenly distributing globules of butter fat contained in milk passing through the valve, without destroying the shape of the globules.

Another object of the invention is the provision of a valve of this type in which the capacity of the valve is increased without increasing its diameter, the principle being applicable to valves of either the semi-balanced or full-balanced type.

With the above and other objects in view, the invention further includes the following novel features and details of construction, to be hereinafter more fully described, illustrated in the accompanying drawings and pointed out in the appended claims.

In the drawings:—

Figure 1:
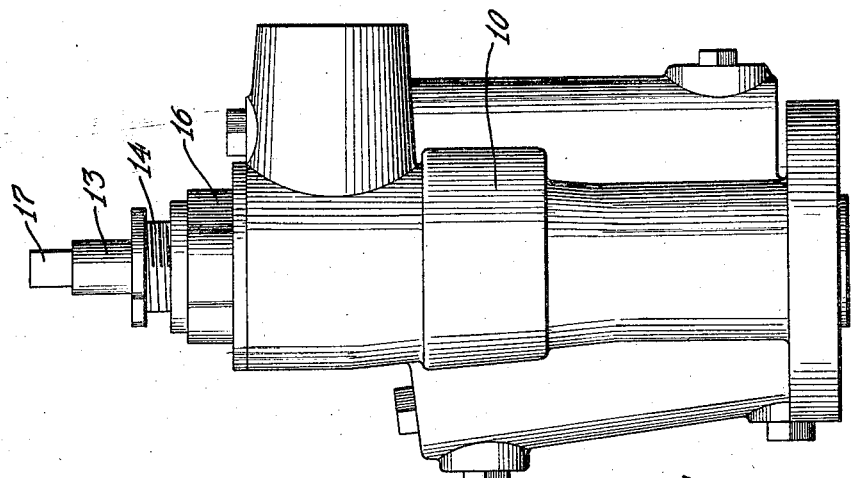
Figure 1 is an elevation of a valve constructed in accordance with the invention.
Figure 2:
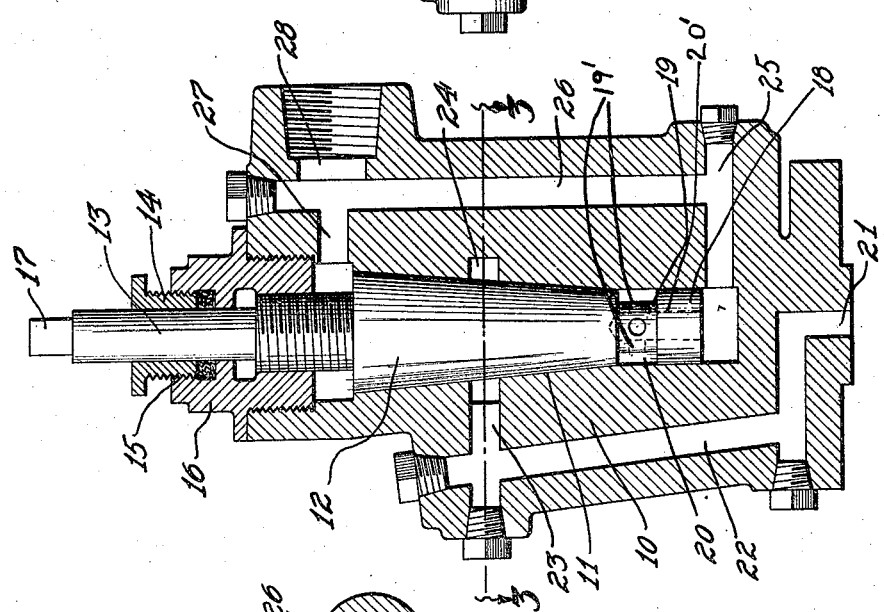
Figure 2 is a vertical sectional view of the same.
Figure 3:
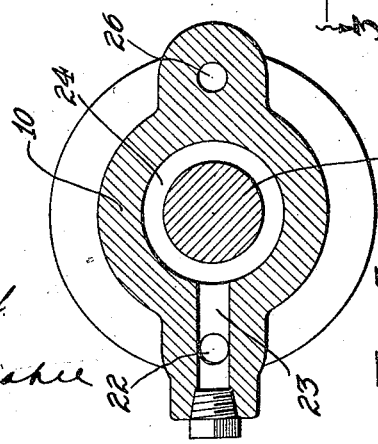
Figure 3 is a section on the line 3—3 of Figure 2.

Referring in detail to the drawings and especially to Figures 1, 2 and 3, the valve shown comprises a casing 10 which is provided with a centrally arranged tapered bore which forms a seat 11 for a tapered valve member 12, the latter being of the plug type. Extending from one end of the valve member 12 is a stem 13 which passes through a packing gland 14 and has a threaded engagement as shown at 15 with a cap 16, the purpose being to operate or adjust the valve with respect to the seat 11. The outer end of the valve stem 13 is of rectangular shape as shown at 17 for the reception of a suitable tool or operating handle.

The lower end of the central bore of the valve is substantially cylindrical and fitting within this cylindrical portion is an extension 18 of the valve member 12, which is connected to said member by means of a neck 19. This provides an annular space 20 which surrounds the neck.

The valve casing 10 is provided with an inlet port 21 which communicates with a longitudinally disposed passage 22, the said passage in turn communicating with a transverse passage 23. This last named passage communicates with an annular chamber 24 which surrounds the valve member 12 at a point approximately midway the length of the said valve member. Also provided in the casing 10 is a transversely arranged passage 25 which communicates with the annular space or chamber 20 surrounding the lower end of the valve member 12. The passage 25 communicates with a longitudinal passage 26, while the last named passage intersects a transverse passage 27, which establishes communication between the passage 26 and the central bore of the valve. The passage 26 is also in communication with an outlet port 28. The reduced part 19 is provided with a plurality of radial ports 19′ which communicate with a boring 20′ in the lower end of the valve and the part 19, thus the fluid entering the chamber 20 will pass through these ports 19′ and discharge through the passage 25 by way of the bore 20′.

Fluid entering the port 21 will pass through the passages 22 and 23 and enter the annular chamber 24. The fluid being under pressure will pass in opposite directions from this chamber around the outer surface of the valve member 12, between said member and its seat 11, the amount of fluid being regulated by the threaded adjustment of the valve. After leaving the passage provided between the valve member 12 and the seat 11, the fluid passes through the passages 25, 26 and 27, through the outlet 28.

As previously stated, the valve is especially adapted for handling milk and the minute globules or particles of butter fat (which are usually in bunches) are separated and evenly distributed in passing through the valve. In addition, the valve provides means for the separation of the butter fat without hammering or destroying the shape of the globules, but separates the bunches and smooths out the globules and evenly distributes them through the mix. By mounting the valve member in the manner shown, hammering of the valve is prevented, with the consequent injury to the butter fat globules, the cylindrical portion of the valve member and the bore acting to guide the lower end of the said member, while the threaded engagement at the opposite end prevents hammering or chattering and in addition permits of a fine and accurate adjustment for the passage of the butter fat. Further, when it is desired to enrich whole or skimmed milk by the addition of butter fat, the long seating surface of the valve member will produce a smooth and unchurnable product. The long seating surface of the valve further acts to provide a smoother mix and its rigid mounting prevents chattering or hammering, an objectionable feature found in spring loaded resilient plate backed valves.

By having the fluid enter the valve bore at its center, the capacity of the valve is increased, as it travels in opposite directions, while if it entered at the lower end of the bore or passed out at this lower end, all traveling in the same direction, its capacity would be determined by the diameter at this end.

The invention is susceptible of various changes in its form, proportions and minor details of construction and the right is herein reserved to make such changes as properly fall within the scope of the appended claims.

Having described the invention what is claimed is:—

1. A valve comprising a casing having a tapered bore, a reciprocable plug valve arranged therein, the casing being provided with a chamber intermediate the ends of the valve and further provided with an inlet opening communicating with the chamber, the casing being also provided with branch outlet openings at the opposite ends of the valve and a passageway communicating with both outlet openings.

2. A valve comprising a casing having a tapered bore, a plug valve reciprocable therein, the casing being provided with a chamber intermediate its ends and further provided with communicating outlet openings, the casing being also provided with an inlet port communicating with the chamber.

In testimony whereof we affix our signatures.

ROBERT J. MAIN.
RUSSELL W. MAIN.
WM. C. RUOPP.
HARRY McELDOWNEY.